United States Patent [19]

Tanaka et al.

[11] Patent Number: 4,543,390

[45] Date of Patent: Sep. 24, 1985

[54] ANTISTATIC RESINOUS COMPOSITIONS

[75] Inventors: Masayuki Tanaka, Nagoya; Katsuharu Morioka, Kani; Akihiko Kishimoto, Nagoya, all of Japan

[73] Assignee: Toray Industries, Inc., Tokyo, Japan

[21] Appl. No.: 683,874

[22] Filed: Dec. 20, 1984

[51] Int. Cl.$^4$ .............................................. C08L 51/08
[52] U.S. Cl. ..................................... 525/63; 525/187; 525/263; 525/303; 525/312; 525/315; 525/316; 525/404
[58] Field of Search ................. 525/63, 187, 263, 315, 525/316, 404, 303

[56] References Cited

U.S. PATENT DOCUMENTS 4,435,541  3/1984  Brandstetter et al. ................ 525/63

*Primary Examiner*—Jacob Ziegler
*Attorney, Agent, or Firm*—Austin R. Miller

[57] ABSTRACT

An antistatic resinours composition comprising (A) graft copolymers prepared by emulsion polymerization of (a) monomer mixture consisting of (i) from 50 to 100 percents by weight of monomers having polyalkylene oxide chains and (ii) from 50 to 0 percents by weight of vinyl monomers in the presence of rubbers and (B) thermoplastic resins compatible with the graft copolymers, has permanent antistatic performances, superior mechanical properties and high flowability.

15 Claims, No Drawings

ANTISTATIC RESINOUS COMPOSITIONS

BACKGROUND OF THE INVENTION

(1) Field of the Invention

The subject invention relates to the antistatic resinous compositions having permanent antistatic performances, the superior mechanical properties represented by impact strength and flexural modulus, and high flowability.

(2) Description of the Prior Art

Thermoplastic resins are extensively used because of their superior characteristics. However, they generally cause various troubles due to static electricity because of their high electric resistances.

Mixing antistatic agents such as water absorbing compounds and surfactants therein and applying them to the surface of the moldings thereof are generally used among the methods for giving antistatic performance thereto. The methods, however, are problematic in that antistatic performance disappears through surface wipe-off and water wash and mixed components bleed out at the surface to deteriorate their quality as the materials.

Proposed methods for giving permanent antistatic performance to thermoplastic resins include the partial copolymerization of hydrophilec monomers such as acrylamide, methacrylamide, polyethyleneglycol acrylate, polyethyleneglycol methacrylate and sodium p-styrene-sulfonate in polymerizing the impact resistant resins represented by acrylonitrile-butadiene-styrene graft terpolymer(ABS) for example (Published Unexamined Japanese Patent Application No. 98317/1983).

Therein, however, the copolymerization quantity of hydrophilic monomers is limited, because they considerably deteriorate in mechanical peoperties such as flexural modulus and impact strength, in flowability and in the resestance to hot water and alcohol, when copolymerized with in great quantities. So, it is difficult to attain sufficient antistatic performance.

Proposed besides is mixing in thermoplastic resins the graft copolymers obtained by graft copolymerizing the hydrophilic rubber polymers with vinyl or vinyliden monomers; the former have been copolymerized conjugate diene or/and acrylate ester and the vinyl monomers having an alkylene oxide radical, or mixing in thermoplastic resins the hydrophilic rubber polymers obtained by copolymerizing conjugate diene or/and acrylate ester, the vinyl monomers having an alkylene oxide radical and unsaturated carboxylic acid monomers (Published Unexamined Japanese Patent Application No. 36237/1980).

They are, however, defective in that their manufacturing processes are complicated because the rabber polymers used are special types and obtained resin compositions have inferior mechanical properties because of those of the rubber polymers.

BRIEF SUMMARY OF THE INVENTION

The object of the invention is to provide the resinous compositions having high permanent antistatic performances without lowering the mechanical properties and flowability excessively.

These and other objects of the invention will become more apparent in the detailed description and examples which follow.

These and other objects of the present invention will be accomplished by obtaining an antistatic resinous composition comprising
(A) from 1 to 70 parts by weight of graft copolymers prepared by emulsion polymerization of
  (a) from 5 to 90 parts by weight of monomer mixture consisting of
    (i) from 50 to 100 percents by weight of at least one monomer having polyalkylene oxide chains represented by the following general formula (I);

wherein R denotes a radical selected from the group consisting hydrogen atom and methyl and n denotes an integer of 2 to 100, and
    (ii) from 50 to 0 percents by weight of at least one vinyl monomer selected from the group consisting of aromatic vinyl monomers, acrylate ester monomers, methacrylate ester monomers and vinyl cyanide monomers
  in the presence of (b) from 95 to 10 parts by weight of rubbers and
(B) from 99 to 30 parts by weight of thermoplastic resins compatible with said graft copolymers.

DETAILED DESCRIPTION OF THE INVENTION

Containing the rubbers (b) being superior in mechanical properties as base polymer and the monomers (i) having polyalkylene oxide radicals as graft chain components, the graft copolymers (A) according to the invention are superior in electric conductivity and mechanical properties. The graft copolymers (A) are superfine particle polymers because they are obtained by emulsion polymerization. When the graft copolymers (A) are mixed with thermoplastic resins (B), the resulting compositions have superior mechanical properties and flowability, because the graft copolymers (A) are present as fine particle phase, no polyalkylene oxide component is present in the matrix resin phase and the graft copolymers (A) have superior mechanical properties itself. Further, since a polyalkylene oxide chain is combined chemically or physically with graft copolymers (A), the obtained resinous compositions neither bleed-out when molded or used nor lose their electric conductivity when washed or wiped and, therefore, show high permanent antistatic performances.

Although their structure is not definitely known, graft copolymers (A) are estimated to have a structure made through such chemical combination as graft polymerization, the physical combination of interpenetrating polymer network structures, or other combination of the monomer components (i) having a polyalkylene oxide chain and vinyl component monomers (ii).

The antistatic resinous compositions according to the invention are obtained by blending the fixed quantities of graft copolymers (A) and thermoplastic resins (B).

The graft copolymers (A) according to the invention are obtained by the emulsion polymerization of from 90 to 5, preferably from 80 to 10 parts by weight of the monomer mixtures (a) composed of from 50 to 100, preferably from 65 to 100 percents by weight of the monomers (i) having a polyalkylene oxide chain (hereinafter referred to PEG monomers) and from 50 to 0, preferably from 35 to 0 percents by weight of at least one of the vinyl monomers (ii) selected from the group consisting of aromatic vinyl monomers, acrylate ester monomers and methacrylate ester monomers, and vinyl cyanide monomers in the presence of from 10 to 95, preferably from 20 to 90 parts by weight of rubbers (b).

Less than 50 percents by weight of PEG monomers (i) in monomer mixtures (a) is not preferable because the antistatic performance is not fully displayed.

Neither less than 10 nor more than 95 parts by weight of rubbers (b) in graft copolymers (A) is preferable because they are inferior in mechanical properties or not sufficient in antistatic performance, respectively.

The rubbers (b) for graft copolymers (A) include conjugate diene rubbers such as polybutadiene rubber (PBD), styrene/butadiene copolymer rubber (SBR), acrylonitrile/butadiene copolymer rubber (NBR) and polyisoprene rubber; acrylic rubbers such as polybutyl acrylate; and polyolefin rubbers such as ethylene-propylene-diene terpolymer rubber (EPDM), ethylene-propylene copolymer rubber (EPR) and ethylene-butene copolymer rubber. Usually conjugate diene and acrylic rubbers are used preferably and acrylonitrile/butadiene copolymer rubber (NBR) most preferably. The type of rubbers (b) is not limited. Latex types, however, are preferable for the facility of emulsion polymerization.

The PEG monomers for graft copolymers (A) are the vinyl monomers (i) having a polyalkylene oxide chain represented by the following formula (I):

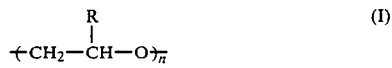

wherein R is a hydrogen atom or a methyl radical, preferably hydrogen atom, and n is an integer selected from 2 to 100, preferably from 4 to 50, more preferably from 5 to 30. The n-values less than 2 or more than 100 are not preferable because antistatic performance is not sufficient or monomers are inferior in polymerization performance, respectively. PEG vinyl monomers are not limited, provided they have a polyalkylene oxide chain represented by the above formula (I). They include polyethyleneglycol acrylate, polyethyleneglycol methacrylate, methoxypolyethyleneglycol acrylate, methoxypolyethyleneglycol methacrylate, polyethyleneglycol maleate, methoxypolyethyleneglycol maleate, polyethyleneglycol acrylamide, methoxypolyethyleneglycol acrylamide, polyethyleneglycol diacrylate and polyethyleneglycol dimethacrylate. More than two thereof are usable in combination. Preferable thereamong are methoxypolyethyleneglycol methacrylate and methoxypolyethyleneglycol acrylate.

Used for graft copolymers (A) are at least one vinyl monomer (ii) selected from the group consisting of aromatic vinyl monomers, acrylate ester monomers, methacrylate ester monomers, and vinyl cyanide monomers.

Among aromatic vinyl monomers, styrene, p-methylstyrene, p-t-butylstyrere, α-methylstyrene and so forth are preferable and styrene, α-methylstyrene and p-methylstyrene more preferable. Among acrylate ester monomers methylacrylate is preferable, and among methacrylate ester monomers methylmethacrylate is preferable, respectively. Among vinyl cyanide monomers, acrylonitrile and methacrylonitrile are preferable, the former being more preferable.

According to the invention the vinyl monomers (ii) mentioned above can be used alone or mixedly for more than one with the optional proportion. Vinyl monomers (ii) are preferably composed of from 50 to 97 percents by weight of monomer selected from the group consisting of aromatic vinyl monomers, acrylate ester monomers and methacrylate ester monomers, and from 3 to 50 percents by weight of vinyl cyanide monomers.

For obtaining graft copolymers (A) by copolymerization, a further small quantity within the range where the effects of the invention are not affected of hydrophilic monomers such as N-vinylpyrrolidone, 2-hydroxyethyl methacrylate, acrylamide and sodium styrenesulfonate; polyfunctional vinyl monomers such as divinylbenzene and triallyl isocyanulate; and vinyl monomers such as maleic anhydride, acrylic acid, methacrylic acid and N-phenylmaleimide can be copolymerized.

The emulsion polymerization is indispensable for obtaining graft copolymers (A). Mass solution, suspension or any other polymerization is not preferable because obtained resinous compositions considerably decrease in flowability and flexural modulus and show no sufficient antistatic performance. Only emulsion polymerization is capable of obtaining the resinous compositions superior in flowability mechanical properties and antistatic performance. Its methods are not limited and those usually known are usable. It is possible to polymerize by using, for example, ordinary anionic and nonionic surfacant emulsifiers including higher fatty acid alkali salts such as sodium laurate and potassium oleate; alkali salts of higher alcohol sulfate ester such as sodium laurylsulfate; and alkali salt of alkylbenzenesulfonate such as sodium dodecylbenzenesulfonate; and polymerization initiators such as potassium persulfate and ammonium persulfate and hydrogen peroxide and cumene hydroperoxide while they are kept emulsified in an aqueous solvent.

The methods of supplying rubbers (b) and monomer mixtures (a) are not limited and possible collectively initially and dividedly or continuously in polymerization. On the latter's divided or continuous supply, their composition is variable during polymerization.

Namely, the processes for preparing graft copolymers (A) include, for example, that consisting of the emulsion polymerization of PEG monomers (i) in the presence of rubbers (b) until its substantial completion, which is followed by the supply and emulsion polymerization of at least one vinyl monomers (ii) selected from the group consisting of aromatic vinyl monomers, acrylate ester monomers, methacrylate ester monomers, vinyl cyanide monomers.

In the emulsion polymerization of PEG monomers (i) it is necessary to substantially complete the polymerization of PEG monomers (i) with its polymerization degree as high as possible. Usually, therefore, the supply and polymerization of vinyl monomers (ii) is carried out after fixing the polymerization degree of charged PEG monomer (i) above 80, preferable above 85 and more above 90 percents by weight. Neither the supply of vinyl monomers (ii) while the polymerization degree of PEG monomers (i) is not sufficiently high nor the simultaneous supply of them and vinyl monomers (ii) is preferable because antistatic performance deteriorated and the effects of the invention are not completely displayed. The method for supplying rubbers (b) and PEG monomers (i) are not limited. The both can be subjected to initial collective or continuous simultaneous supply, or rubbers (b) to initial collective supply and PEG monomers (i) to continuous supply.

The processes for preparing graft copolymers (A) also include, for example, that consisting of the emulsion polymerization of at least one vinyl monomers (ii) in the presence of rubbers (b) until its substantially completion, which is follwed by the supply and emulsion polymerization of PEG monomers (i).

The methods of supplying vinyl polymers (ii) and PEG monomers (i) are not limited and desired ones are usable.

The graft copolymers (A) according to the invention are superior in rubber elasticity and electric conductivity, because they contain rubbers (b) as base rubber as well as the hydrophilic components (i) containing the vinyl monomers having a polyalkylene oxide chain and vinyl polymer chain components (ii) as graft components. Being manufactured by emulsion polymerization, they are in fine particle dispersion phase. Since no hydrophilic components are present in the matrix resin phase, resinous compositions are superior in mechanical properties and flowability. Further, they show high permanent antistatic performances because polyalkylene oxide chain component is present in graft copolymers (A) and chemically combined (dispersion phase).

The thermoplastic resins (B) according to the invention are not limited, provided they are superior in compatibility with graft copolymers (A). one or at least two can be selected from the group consisting of vinyl polymer resins such as styrene-acrylonitrile copolymer (SAN) resin, polystyrene, polymethyl methacrylate, α-methylstyrene/aceylonitrile copolymer, p-methylstyrene/acrylonitrile copolymer, p-t-butylstyrene/acrylonitrile copolymer, styrene/methyl methacrylate/acrylonitrile terpolymer, α-methylstyrene/styrene/acrylonitrile terpolymer, α-methylstyrene/methyl methacrylate/acrylonitrile terpolymer, styrene/maleic anhydride copolymer, styrene/N-phenyl maleimide copolymer, polyglutarimide and polyvinyl chloride; pololefin resins such as polyethylene and polypropylene; rubber modified thermoplastic resins such as polybutadiene/styrene/acrylonitrile graft terpolymer (ABS) resin, polybutadiene/methyl methacrylate/styrene graft terpolymer (MBS) resin, polybutadiene/styrene graft copolymer (high-impact PS) and polybutadiene/methyl methacrylate graft copolymer; polyamide resins such as Nylon-6 and Nylon-66; polyester resins such as plybutylene terephthalate and polyethylene terephthalate; polycarbonate resin; polyphenylene oxide resin; modified polyphenylene oxide resin; and polyoxymethylene resin. Besides, desired thermoplastic resins superior in compatibility with graft copolymers (A) are usable.

Preferable among the thermoplastic resins (B) according to the invention are (α) the polymers prepared by polymerizing at least one vinyl monomer selected from the group consisting of aromatic vinyl monomers, acrylate ester monomers, methacrylate ester monomers, and vinyl cyanide monomers in the presence of rubbers and (β) the polymers prepared by polymerizing at least one vinyl monomer selected from the group consisting of aromatic vinyl monomers, acrylate ester monomers, and methacrylate ester monomers and vinyl cyanide monomers in the absence of rubbers. These polymers (α) and polymers (β) are especially superior in compatibility with graft copolymers (A).

In polymers (α), the aromatic vinyl monomers include styrene, α-methylstyrene, vinyltoluene, p-methylstyrene and p-t-butylstyrene; the acrylate ester monomers and methacrylate ester monomers include methyl methacrylate and ethyl methacrylate and methyl acrylate and ethyl acrylate; and vinyl cyanide monmers include acrylonitrile and methaceylonitrile.

Polymers (α) are manufactured by polymerizing the mixtures of preferably from 50 to 97, more preferably 60 to 90 percents by weight of aromatic vinyl monomers and/or acrylate ester monomers and/or methyacrylate ester monomers and preferably from 3 to 50, more preferably from 10 to 40 percents by weight of vinyl cyanide monomers.

The processes for manufacturing polymers (α) are not limited. Lump, suspension, emulsion, solution, lump-suspension and other generally known polymerization methods are usable. The methods of supplying monomer mixtures for manufacturing polymers (α) are not limited. Initial collective, divided or continuous supply is allowable. On divided and continuous supply their composition is variable during polymerization. Usable in combination with the foregoing monomers are other vinyl monomers such as maleic anhydride, N-phenylmaleimide, N-methylmaleimide, acrylic acid and methacrylic acid, provided the effects of the invention are not affected.

Used among the rubbers for polymers (β) are diene rubbers such as polybutadiene rubber, styrenebutadiene copolymer rubber (SBR) and acrylonitrilebutadiene copolymer rubber (NBR); acrylic rubbers such as polybutyl acrylate; and polyolefin rubbers such as ethylene-propylene-diene terpolymer rubber (EPDM). Aromatic vinyl monomers, acrylate ester monomers, methacrylate ester monomers and vinyl cyanide monomers include those mentioned in connection with the foregoing polymers (α).

Polymers (β) are manufactured by polymerizing preferably from 95 to 20 more preferably from 90 to 30 parts by weight of the monomer mixtures composed of preferably from 50 to 97 more preferably from 60 to 90 percents by weight of aromatic vinyl monomers and/or acrylate ester monomers and/or methacrylate ester monomers and preferably from 3 to 50, more preferably from 10 to 40 percents by weight of vinyl cyanide monomers in the presence of preferably from 5 to 80, more preferably from 10 to 70 parts by weight of rubbers.

The processes for manufacturing polymers (β) are not limited. Emulsion, suspension, mass, solution, mass-suspension and other generally known polymerization methods are usable. The mithods for supplying rubbers and monomer mixtures for manufacturing polymer (β) are neither limited. Initial collective, divided or continuous supply is possible, For polymers (β) other vinyl monomers are usable besides aromatic vinyl monomers, acrylate ester monomers, methacrylate ester monomers and vinyl cyanide monomers within the range where the effects of the invention are not affected.

Preferable among polymers (α) and polymers (β) are styreneacrylonitrile (SAN) resin, polystyrene, polymethyl methacrylate, α-methylstyrene/acrylonitrile copolymer, p-methylstyrene/acrylonitrile copolymer, p-t-butylstyrene/acrylonitrile copolymer, styrene/methyl methacrylate/acrylonitrile terpolymer, α-methylstyrene/styrene/acrylonitrile terpolymer, α-methylstyrene/methyl methacrylate/acrylonitrile terpolymer, polybutadiene/styrene/acrylonitrile graft terpolymer (ABS) resin, polybutadiene/methyl methacrylate/styrene graft terpolymer (MBS) resin, polybutadiene/styrene graft copolymer (high-impact PS) and polybutadiene/methyl methacrylate graft copolymer.

Polymers (α) and polymers (β) are usable alone or in mixture form. For example, after separately prepared by polymerization, the latter having a comparatively large content of rubbers and the former containing no rubbers can be mixed at proper ratios.

The mixing ratio of graft copolymers (A) and thermoplastic resins (B) in the resinous compositions according to the invention is from 1 to 80 preferably from 5 to 60 parts by weight of graft copolymers (A) and from 99 to 20, preferably from 95 to 40 parts by weight of thermoplastic resins (B), (A) and (B) being totaled to 100 parts by weight. Less than 1 or more than 80 parts by weight of graft copolymers (A) is not preferable because no antistatic performance is developed or mechanical properties such as flexural modulus deteriorates, respectively.

The processes for manufacturing the resinous compositions according to the invention are not limited and those generally known are usable. For example, polymers can be supplied to an extruder after or without preliminary latex blending, powder blending or henschel mixing depending on their shape, subjected to melting kneading and pelletized.

The resinous compositions according to the invention can be further improved in antistatic performance by adding antistatic agents such as cationic, anionic and nonionic surfactants. Antioxidants, various stabilizers such as ultraviolet adsorbing agents, flame retardants, pigments, dyes, lubricants, plasticizers and so forth can be added if necessary.

The invention will be more clearly understood with reference to the following Examples.

In the following examples, the volume resistivity factor of the 3 mm-thick square boards manufactured extrusion molding, was measured in a room atmosphere at a temperature of 23° C. and a humidity of 50 percents RH using superinsulation ohmmeter Model SM-10 manufactured ty Toa Dempa Kogyo K.K. Their flexural modulus factor and Izod impact strength were measured in accordance with ASTM D790 and D256 A methods, respectively. The parts and percents mentioned hereinafter are expressed by weight.

EXAMPLES 1-17

(MANUFACTURE OF GRAFT COPOLYMERS (A))

The graft copolymers (A) having the compositions shown in Table 1 were prepared by the following methods.

(A-1) to (A-11): 150 parts of pure water, 0.5 part of grape sugar, 0.5 part of sodium pyrophosphate, 0.005 part of ferrous sulfate and the fixed quantities shown in Table 1 of rubbery polymers (latex) were supplied to a nitrogen-replaced polymerizer and sufficiently stirred.

Next, the fixed quantities shown in Table 1 of monomer mixtures (a) were kept supplied via one charge port at a constant rate for four hours while the temperature therein is being adjusted to 60° C. In parallel an aqueous solution composed of 30 parts of pure water, 2.5 parts of potassium oleate (emulsifier) and 0.2 part of cumene hydroperoxide (initiator) was kept supplied via the other charge port at a constant rate for six hours. After the completion of this addition, additional polymerization was continued for one hour with temperature raised to 75° C. The polymers obtained therethrough were coagulated by adding magnesium sulfate, washed, dehydrated and dried for obtaining these graft copolymers (A-1)–(A-11).

(A-12): This graft copolymer (A-12) having a composition shown in Table 1 was manufactured through quite the same process as (A-1) to (A-11) except that no rubbers (b) was supplied.

(A-13): After an autoclave having a stirrer was subjected to nitrogen replacement, 40 parts of polybutadiene, 80 parts of methylethylketone and 0.5 part of benzoyl peroxide (initiator) were supplied and dissolved through sufficient stirring. Next, a fixed quantity shown in Table 1 of monomer mixture (a) was kept supplied via one charge port at a constant rate for four hours while the temperature therein is being adjusted to 80° C. Thereafter the temperature was kept adjusted to 80° C. for two hours, raised to 90° C. and kept adjusted thereto for two hours. After the completion polymerization, polymers were subjected to solvent extraction for obtaining this graft copolymer (A-13).

(A-14): 200 parts of pure water and 0.5 part of 80 percent saponified polyvinyl alcohol (suspension stabilizer) were supplied to a nitrogen replaced polymerizer and sufficiently dissolved and a solution composed of a fixed quantity shown in Table 1 polybutadiene rubber and a monomer mixture (a) and 0.5 part of benzoyl peroxide (initiator) were supplied and stirred at a high speed for obtaining a suspension. The suspension was kept subjected to the polymerization at 80° C. for six hours and at 90° C. for two hours. The polymer manufactured therethrough was dehydrated and dried for obtaining this graft polymer (A-14).

TABLE 1

| | Graft co-Polymer (A) | Rubbers (b) (part) | Monomer mixture (a) (part) | | | |
|---|---|---|---|---|---|---|
| | | | PEG monomer (i) | Styrene | Methyl methacrylate | Acrylonitrile |
| For Example | A-1 | NBR-1 80 | PEG-1 20 | — | — | — |
| | A-2 | NBR-2 50 | PEG-2 30 | 14 | — | 6 |
| | A-3 | NBR-1 60 | PEG-4 25 | 11 | — | 4 |
| | A-4 | PBD 40 | PEG-1 40 | 14 | — | 6 |
| | A-5 | PBD 20 | PEG-2 40 | 40 | — | — |
| | A-6 | NBR-2 45 | PEG-3 55 | — | — | — |
| | A-7 | PBA 40 | PEG-1 35 | — | 25 | — |
| | A-8 | PBA 40 | PEG-1 35 | 18 | — | 7 |
| | A-9 | NBR-1 50 | — | 35 | — | 15 |
| For Comparative Example | A-11 | PBD 40 | PEG-1 15 | 32 | — | 13 |
| | A-12 | — | PEG-1 67 | 23 | — | 10 |
| | A-13 | PBD 40 | PEG-1 40 | 14 | — | 6 |
| | | (Solution polymerization) | | | | |
| | A-14 | PBD 40 | PEG-1 40 | 14 | — | 6 |

TABLE 1-continued

| Graft co-Polymer (A) | Rubbers (b) (part) | Monomer mixture (a) (part) | | | |
|---|---|---|---|---|---|
| | | PEG monomer (i) | Styrene | Methyl methacrylate | Acrylonitrile |
| (Suspension polymerization) | | | | | |

PBD: Polybutadiene rubber
NBR-1: Butadiene/acrylonitrile = 75/25 (percent) copolymer rubber (latex)
NBR-2: Butadiene/acrylonitrile = 67/33 (percent) copolymer rubber (latex)
PBA: Polybutyl acrylate rubber
PEG-1: Methoxypolyethyleneglycol methacrylate (mean polymerization degree of ethylene oxide chain: 9)
PEG-2: Methoxypolyethyleneglycol methacrylate (mean polymerization degree of ethylene oxide chain: 23)
PEG-3: Methoxypolyethyleneglycol acrylate (mean polymerization degree of ethylene oxide chain: 9)
PEG-4: Methoxypolyethyleneglycol acrylate (mean polymerization degree of ethylene oxide chain: 30)

(MANUFACTURE OF POLYMERS (α))

Copolymers (α-1) to (α-3) were manufactured by polymerizing the monomer mixtures having the compositions shown in Table 2.

TABLE 2

| Polymer (α) | Monomer mixture (part) | | | |
|---|---|---|---|---|
| | Styrene | α-Methylstyrene | p-Methylstyrene | Acrylonitrile |
| α-1 | 70 | — | — | 30 |
| α-2 | — | 75 | — | 25 |
| α-3 | — | — | 75 | 25 |

(MANUFACTURE OF POLYMERS (β))

Polymers (β) were manufactured by polymerizing monomer mixtures at the ratios shown in Table 3 in the presence of rubbers.

TABLE 3

| Polymer (β) | Rubbers (b) (part) | Monomer mixture (part) | |
|---|---|---|---|
| | | Styrene | Acrylonitrile |
| β-1 | PBD 50 | 35 | 15 |
| β-2 | PBD 15 | 63 | 22 |
| β-3 | EPDM 30 | 49 | 21 |

PBD: Polybutadiene rubber
EPDM: "Mitsui EPT" #3045(Trade mark) (manufactured by Mitsui Petroleum Chemistry Co.): Ethylene/propylene/diene terpolymer rubber (MANUFACTURE OF RESINOUS COMPOSITIONS)

Pellets were manufactured by a process wherein the graft copolymers (A), polymers (α) and polymers (β), and the following thermoplastic resins were mixed at the ratios shown in Table 4 and 5 and subjected to the melting kneading and extrusion by a 40 mmφ extruder. Next, testpieces were molded using a extrusion molding machine at a cylinder temperature of 220° C. and a die temperature of 50° C. and subjected to the measuring of physical properties.

(1) "ACRYPET" MD (Trade mark) (manufactured by Mitsubishi Rayon Co., Ltd.): methacryl resin
(2) "DYLARK" 332 (Trade mark) (manufactured by ARCO Chemical Company): styrene/maleic anhydride copolymer
(3) "LEXAN" 121 (Trade mark) (manufactured by Engineering Plastics K.K.): polycarbonate
(4) "AMILAN" CM1017 (Trade mark) (manufactured by Toray Industries, Inc.): Nylon-6
(5) TORAY PBT1401 (manufactured by TORAY Industries, Inc.): polybutylene terephthalate
(6) "NORYL" 731J (Trade mark) (manufactured by Engineering Plastics K.K.): modified polyphenylene oxide
(7) "TOYOLAC" 100 (Trade mark) (manufactured by Toray Industries, Inc.): acrylonitrile/butadiene/styrene graft terpolymer The volume resistivity factor of the 3 mm-thick square boards obtained by extrusion molding was measured:

(1) With humidity kept controlled to 50 percents RH at 23° C. for 24 hours immediately after molding.
(2) With humidity kept adjusted to 50 percents RH at 23° C. for 24 hours. Beforehand, boards were washed by using an aqueous solution of detergent "MAMA LEMON" (Trade mark) (manufactured by Lion Fat & Oil Co., Ltd.), then sufficiently washed by using distilled water and subjected to surface water removal immediately after molding.
(3) After 100 days' leaving at 50 percents RH and 23° C. after molding
(4) With humidity kept adjusted to 50 percents RH at 23° C. for 24 hours. Beforehand, boards were left at 50 percents RH and 23° C. for 100 days, washed by using an aqueous solution of detergent "MAMA LEMON", then sufficiently washed by using distilled water and subjected to surface water removal after molding.

The results of measuring are shown in Table 4 and 5.

TABLE 4

| Example No. | Resinous Composition (part) | | |
|---|---|---|---|
| | Graft copolymer (A) | Thermoplastic resins (B) | |
| 1 | A-1 (30) | α-1 (70) | — |
| 2 | A-2 (35) | α-1 (65) | — |
| 3 | A-3 (35) | α-1 (65) | — |
| 4 | A-1 (30) | α-2 (70) | — |
| 5 | A-1 (30) | α-3 (70) | — |
| 6 | A-1 (8) | α-1 (72) | β-1 (20) |
| 7 | A-1 (20) | α-1 (70) | β-1 (10) |
| 8 | A-1 (25) | — | β-2 (75) |
| 9 | A-1 (20) | α-1 (60) | β-3 (40) |
| 10 | A-7 (30) | "ACRYPET" MD (70) | |
| 11 | A-5 (30) | "DYLARK" 332 (70) | |
| 12 | A-8 (30) | "LEXAN" 121 (70) | |
| 13 | A-4 (30) | "AMILAN" CM1017 (70) | |
| 14 | A-4 (30) | TORAY PBT1401 (70) | |
| 15 | A-5 (30) | "NORYL" 731J (70) | |
| 16 | A-6 (30) | α-1 (70) | |
| 17 | A-4 (30) | "TOYOLAC" 100 (70) | |

| Example No. | Melt viscosity (measured temp. (°C.)) (× 10³ poise) | Physical properties | |
|---|---|---|---|
| | | Izod impact strength (kg · cm/cm · notch) | Flexural modulus (kg/cm²) |
| 1 | — | 8 | 19000 |
| 2 | — | 9 | 18500 |
| 3 | — | 10 | 19300 |
| 4 | — | 7 | 19300 |
| 5 | — | 8 | 19000 |
| 6 | — | 10 | 22800 |
| 7 | — | 13 | 20300 |
| 8 | — | 14 | 14800 |
| 9 | — | 13 | 15700 |
| 10 | 13 (210° C.) | — | 21000 |
| 11 | 9 (240° C.) | — | 20100 |
| 12 | 17 (280° C.) | — | 16100 |
| 13 | 5 (250° C.) | — | 19400 |

TABLE 4-continued

| Example No. | Melt viscosity (measured temp. (°C.)) (× 10³ poise) | Izod impact strength (kg · cm/cm · notch) | Flexural modulus (kg/cm²) |
|---|---|---|---|
| 14 | 4 (250° C.) | — | 17900 |
| 15 | 12 (270° C.) | — | 20300 |
| 16 | 6 (220° C.) | — | 19800 |
| 17 | 7 (220° C.) | — | 15100 |

| Example No. | Physical properties Volume resistivity (Ωcm) | | | |
|---|---|---|---|---|
| | Immediately after molding | | After 100 days' leaving | |
| | No treatment | After wash treatment | No treatment | After wash treatment |
| 1 | — | $4 \times 10^{10}$ | — | $4 \times 10^{10}$ |
| 2 | — | $8 \times 10^{10}$ | — | $9 \times 10^{10}$ |
| 3 | — | $3 \times 10^{11}$ | — | $3 \times 10^{11}$ |
| 4 | — | $6 \times 10^{10}$ | — | $6 \times 10^{10}$ |
| 5 | — | $5 \times 10^{10}$ | — | $7 \times 10^{10}$ |
| 6 | — | $1 \times 10^{13}$ | — | $1 \times 10^{13}$ |
| 7 | — | $2 \times 10^{11}$ | — | $2 \times 10^{11}$ |
| 8 | — | $3 \times 10^{11}$ | — | $3 \times 10^{11}$ |
| 9 | — | $4 \times 10^{11}$ | — | $4 \times 10^{11}$ |
| 10 | $2 \times 10^{11}$ | $4 \times 10^{11}$ | $1 \times 10^{11}$ | $5 \times 10^{11}$ |
| 11 | $3 \times 10^{11}$ | $3 \times 10^{11}$ | $2 \times 10^{11}$ | $3 \times 10^{11}$ |
| 12 | $8 \times 10^{11}$ | $8 \times 10^{11}$ | $5 \times 10^{11}$ | $8 \times 10^{11}$ |
| 13 | $8 \times 10^{10}$ | $8 \times 10^{10}$ | $6 \times 10^{10}$ | $8 \times 10^{10}$ |
| 14 | $7 \times 10^{11}$ | $8 \times 10^{11}$ | $5 \times 10^{11}$ | $8 \times 10^{11}$ |
| 15 | $8 \times 10^{11}$ | $8 \times 10^{11}$ | $5 \times 10^{11}$ | $7 \times 10^{11}$ |
| 16 | $3 \times 10^{10}$ | $3 \times 10^{10}$ | $2 \times 10^{10}$ | $3 \times 10^{10}$ |
| 17 | $5 \times 10^{11}$ | $5 \times 10^{11}$ | $1 \times 10^{11}$ | $6 \times 10^{11}$ |

TABLE 5

| Comparative Example No. | Resinous Composition (part) | | |
|---|---|---|---|
| | Graft copolymer (A) | Thermoplastic resins (B) | |
| 1 | — | α-1 (70) | β-1 (30) |
| 2 | — | — | β-2 (100) |
| 3 | — | α-1 (30) | β-3 (70) |
| 4 | A-9 (30) | α-1 (70) | — |
| 5 | NBR-1 (25) | α-1 (75) | — |
| 6 | A-1 (100) | — | — |
| 7 | A-2 (100) | — | — |
| 8 | A-3 (100) | — | — |
| 9 | A-9 (100) | — | — |
| 10 | — | α-1 (100) | — |
| 11 | — | "ACRYPET" MD | (100) |
| 12 | — | "DYLARK" 332 | (100) |
| 13 | — | "LEXAN" 121 | (100) |
| 14 | — | "AMILAN" CM1017 | (100) |
| 15 | — | TORAY PBT1401 | (100) |
| 16 | — | "NORYL" 731J | (100) |
| 17 | A-4 (90) | "TOYOLAC" 100 | (10) |
| 18 | A-11 (30) | "TOYOLAC" 100 | (70) |
| 19 | A-12 (30) | "TOYOLAC" 100 | (70) |
| 20 | A-13 (30) | "TOYOLAC" 100 | (70) |
| 21 | A-14 (30) | "TOYOLAC" 100 | (70) |

| Comparative Example No. | Melt viscosity (measured temp. (°C.)) (× 10³ poise) | Physical properties | |
|---|---|---|---|
| | | Izod impact strength (kg · cm/cm · notch) | Flexural modulus (kg/cm²) |
| 1 | — | 22 | 25500 |
| 2 | — | 24 | 25000 |
| 3 | — | 35 | 20500 |
| 4 | — | 15 | 23000 |
| 5 | — | 18 | 16500 |
| 6 | — | none break | 330 |
| 7 | — | none break | 780 |
| 8 | — | none break | 850 |
| 9 | — | none break | 2330 |
| 10 | 2 (220° C.) | — | 33100 |
| 11 | 10 (210° C.) | — | 31000 |
| 12 | 7 (240° C.) | — | 33000 |
| 13 | 17 (280° C.) | — | 23000 |
| 14 | 2 (250° C.) | — | 29000 |
| 15 | 3 (250° C.) | — | 25000 |
| 16 | 11 (270° C.) | — | 25600 |
| 17 | 18 (220° C.) | — | 6100 |
| 18 | 9 (220° C.) | — | 18800 |
| 19 | 10 (220° C.) | — | 11200 |
| 20 | 35 (220° C.) | — | 9800 |
| 21 | 31 (220° C.) | — | 10100 |

| Comparative Example No. | physical properties Volume resistivity (Ωcm) Immediately after molding | |
|---|---|---|
| | No treatment | After wash treatment |
| 1 | — | $5 \times 10^{16}$ |
| 2 | — | $4 \times 10^{16}$ |
| 3 | — | $7 \times 10^{16}$ |
| 4 | — | $1 \times 10^{15}$ |
| 5 | — | $4 \times 10^{14}$ |
| 6 | — | $2 \times 10^{7}$ |
| 7 | — | $8 \times 10^{7}$ |
| 8 | — | $2 \times 10^{8}$ |
| 9 | — | $1 \times 10^{14}$ |
| 10 | $4 \times 10^{16}$ | $4 \times 10^{16}$ |
| 11 | $2 \times 10^{16}$ | $2 \times 10^{16}$ |
| 12 | $3 \times 10^{16}$ | $3 \times 10^{16}$ |
| 13 | $4 \times 10^{16}$ | $4 \times 10^{16}$ |
| 14 | $5 \times 10^{14}$ | $5 \times 10^{14}$ |
| 15 | $4 \times 10^{16}$ | $4 \times 10^{16}$ |
| 16 | $5 \times 10^{16}$ | $5 \times 10^{16}$ |
| 17 | $5 \times 10^{8}$ | $8 \times 10^{8}$ |
| 18 | $3 \times 10^{15}$ | $3 \times 10^{15}$ |
| 19 | $3 \times 10^{14}$ | $3 \times 10^{14}$ |
| 20 | $5 \times 10^{15}$ | $5 \times 10^{15}$ |
| 21 | $7 \times 10^{15}$ | $7 \times 10^{15}$ |

What we claim is:

1. An antistatic resinous composition comprising
(A) from 1 to 70 parts by weight of graft copolymers prepared by emulsion polymerization of
   (a) from 5 to 90 parts by weight of monomer mixture consisting of
      (i) from 50 to 100 percents by weight of at least one monomer having polyalkylene oxide chains represented by the following general formula (I);

wherein R denotes a radical selected from the group consisting hydrogen atom and methyl and n denotes and integer of 2 to 100, and
      (ii) from 50 to 0 percents by weight of at least one vinyl monomer selected from the group consisting of aromatic vinyl monomers, acrylate ester monomers, methacrylate ester monomers and vinyl cyanide monomers
in the presence of (b) from 95 to 10 parts by weight of rubbers and
(B) from 99 to 30 parts by weight of thermoplastic resins compatible with said graft copolymers.

2. An antistatic resinous composition according to claim 1, wherein thermoplastic resins are at least one selected from the group consisting of (β) polymer prepared by polymerization of (a) at least one vinyl monomer selected from the group consisting of aromatic vinyl monomers, acrylate ester monomers, methacrylate ester monomers, and vinyl cyanide monomers in the absence of (b) rubbers and (β) polymer prepared by polymerization of (a) at least one vinyl monomer selected from the group consisting of aromatic vinyl monomers, acrylate ester monomers, methacrylate ester monomers and vinyl cyanide monomers in the presence of (b) rubbers.

3. An antistatic resinous composition according to claim 1, wherein rubbers (b) are selected from the group consisting of conjugate diene rubbers and acryl rubbers.

4. An antistatic resinous composition according to claim 3, wherein rubbers (b) are copolymer from acrylonitrile and butadiene rubber.

5. An antistatic resinous composition according to claim 1, wherein monomer mixture (a) consists of (i) from 65 to 100 percent by weight of monomer having polyalkylene oxide chains, and (ii) from 35 to 0 percents by weight of at least one vinyl monomer selected from the group consisting of aromatic vinyl monomers, acrylate ester monomers, methacrylate ester monomers and vinyl cyanide monomers.

6. An antistatic resinous composition according to claim 1, wherein composition comprises from 5 to 60 parts by weight of graft copolymers (A) and from 95 to 40 parts by weight of thermoplastic resins (B).

7. An antistatic resinous composition according to claim 1, wherein vinyl monomer (ii) selected from the group consisting of aromatic vinyl monomers, acrylate ester monomers, methacrylate ester monomers and vinyl cyanide monomers comprises 50 to 97 percent by weight of at least one monomer selected from the group consisting of aromatic vinyl monomer, acrylate ester monomers, and methacrylate ester monomers and from 3 to 50 percent by weight of vinyl cyanide monomers.

8. An antistatic resinous composition according to claim 1, wherein R in said formula (I) is hydrogen atom and n in said formula (I) is an integer of 5 to 30.

9. An antistatic resinous composition according to claim 1, wherein monomer (i) having polyalkylene oxide chains is selected from the group consisting of methoxypoly(ethylene glycol) methacrylate and methoxypoly(ethylene glycol)acrylate.

10. An antistatic resinous composition according to claim 1, wherein aromatic vinyl monomer is selected from the group consisting of styrene, α-methylstyrene, and p-methylstyrene.

11. An antistatic resinous composition according to claim 1, wherein methacrylate ester monomer is methyl methacrylate.

12. An antistatic resinous composition according to claim 1, wherein acrylate ester monomer is methyl acrylate.

13. An antistatic resinous composition according to claim 1, wherein vinyl cyanide monomer is acrylonitrile.

14. A process for preparing an antistatic resinous composition according to claim 1, wherein graft copolymer (A) is prepared by charging and emulsion polymerizing monomer (i) having polyalkylene oxide chains in the presence of rubbers (b) in the reaction system, followed by charging and emulsion polymerizing at least one vinyl monomer (ii) selected from the group consisting of aromatic vinyl monomers, acrylate ester monomers, methacrylate ester monomers and vinyl cyanide monomers.

15. A process for preparing an antistatic resinous composition according to claim 1, wherein graft copolymer (A) is prepared by charging and emulsion polymerizing at least one vinyl monomer (ii) selected from the group consisting of aromatic vinyl monomers, acrylate ester monomers, methacrylate ester monomers and vinyl cyanide monomers, in the presence of rubbers (b) in the reaction system, followed by charging and emulsion polymerizing monomer (i) having polyalkylene oxide chains.

* * * * *

UNITED STATES PATENT AND TRADEMARK OFFICE
CERTIFICATE OF CORRECTION

PATENT NO. : 4,543,390
DATED : September 24, 1985
INVENTOR(S) : Masayuki Tanaka, Katsuharu Morioka & Akihiko Kishimoto It is certified that error appears in the above-identified patent and that said Letters Patent is hereby corrected as shown below:

Claim 2, line 3, cancel "( $\beta$ )" and insert -- $\alpha$ --.

Signed and Sealed this

Twenty-fourth Day of March, 1987

Attest:

DONALD J. QUIGG

*Attesting Officer*    *Commissioner of Patents and Trademarks*